United States Patent
Simpson et al.

(10) Patent No.: US 6,990,362 B2
(45) Date of Patent: Jan. 24, 2006

(54) COMMUNICATION UNIT ENERGY CONSERVATION APPARATUS AND METHOD

(75) Inventors: Floyd D. Simpson, Lake Worth, FL (US); Jaime A. Borras, Hialeah, FL (US); Eryk Dutkiewicz, Figtree (AU); Raad Raad, Cringila (AU); Christopher G. Ware, Abbotsford (AU)

(73) Assignee: Motorola, Inc., Schaumburg, IL (US)

( * ) Notice: Subject to any disclaimer, the term of this patent is extended or adjusted under 35 U.S.C. 154(b) by 8 days.

(21) Appl. No.: 10/737,356

(22) Filed: Dec. 16, 2003

(65) Prior Publication Data

US 2005/0130713 A1 Jun. 16, 2005

(51) Int. Cl.
*H04Q 7/32* (2006.01)

(52) U.S. Cl. .................. 455/574; 455/572; 455/550.1; 455/552.1; 455/553.1; 455/343.1; 455/343.5; 455/343.4; 340/7.32; 340/7.34

(58) Field of Classification Search ............... 455/574, 455/572, 343.1–343.6, 422.1, 403, 550.1, 455/552.1, 500, 517, 575.1, 435, 435.2, 434, 455/502, 465, 423, 424, 425, 426.1, 426.2, 455/73, 553.1, 575.7, 90.3, 458; 379/433.01, 379/428.01; 340/7.32, 7.2, 7.1, 7.34
See application file for complete search history.

(56) References Cited

U.S. PATENT DOCUMENTS

| | | | |
|---|---|---|---|
| 2001/0010689 A1* | 8/2001 | Awater et al. | 370/344 |
| 2003/0036354 A1* | 2/2003 | Lee et al. | 455/41 |
| 2003/0228890 A1* | 12/2003 | Falaki | 455/574 |
| 2004/0092286 A1* | 5/2004 | Stattin et al. | 455/552.1 |

* cited by examiner

*Primary Examiner*—Keith T. Ferguson

(57) ABSTRACT

A communication unit (10) can have at least a first receiver (11) and a second receiver (12). The latter typically consumes more power than the former during ordinary operation. Pursuant to one embodiment a communication unit can use the lower-power receiver to detect energy on a monitored channel while the second receiver is retained in a reduced power mode of operation. Upon detecting an absence of channel activity the second receiver can be restored to normal operability to effect such activities as are then presently required.

30 Claims, 3 Drawing Sheets

COMMUNICATION UNIT ENERGY CONSERVATION APPARATUS AND METHOD

TECHNICAL FIELD

This invention relates generally to communication units and more particularly to energy conservation as corresponds to reception and/or transmission activity.

BACKGROUND

Various energy conservation techniques are known and used to attempt to extend the duration during which a portable device can be used with a given portable power source such as a battery. For example, many such devices incorporate a so-called sleep mode of operation during which the device operates in a reduced power mode of operation to thereby reduce average power demand over time.

Some wireless communication devices at least attempt to incorporate such a reduced power mode of operation into their facilitating signaling protocols. For example, a well known 802.11 protocol supports a powering saving mode. During a normal mode of operation, the 802.11-compliant device is typically either actively transmitting or receiving. Just prior to entering a reduced power mode of operation the device transmits a short data packet to a corresponding access point to inform the access point that the device is entering a reduced power mode of operation. The access point then typically buffers any packets that are received by the access point for transmission to the device. During the reduced power mode of operation the device occasionally monitors the access point beacon frame transmissions at different wake-up times to thereby determine if the access point has any buffered packets for the device. Upon detecting a notice that buffered frames are available for transmission to the device, the device can transmit a short data packet to the access point to indicate that the device will now enter a normal mode of operation and will therefore be available to receive transmissions of the buffered packets.

Such a protocol will typically provide at least some savings, over time, of energy consumption by the 802.11-compliant device. Unfortunately, all expected savings are not always achieved. For example, to effect the above procedure, the device must transmit at least a short message to the access point. Also pursuant to the 802.11 protocol, however, the device must typically first ascertain that the channel is clear during a particular preceding window of interest by using a clear channel assessment process. When the channel is busy, the device must usually defer until the channel is clear for at least a given amount of time and must then further defer by going into a so-called back-off mode of operation. During the latter mode of operation, a random (or at least pseudo-random) selection occurs to determine a particular contention window slot to be used by the device to transmit its message. More particularly, the device must typically be in an active receive mode during this window of activity in order to perform the clear channel assessment process. This active receive mode can be of potentially great duration (depending upon how busy the channel is) and can contribute greatly to a consumption of power notwithstanding the power-saving intent of the overall methodology.

BRIEF DESCRIPTION OF THE DRAWINGS

The above needs are at least partially met through provision of the communication unit energy conservation apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a communication unit can determine a need to transmit a communication on a channel and then use a receiver to monitor indicia of energy on the channel while substantially simultaneously placing the receiver into a reduced power mode of operation such that the receiver uses less power than during normal operation thereof The communication device can then effect an activation event as a function, at least in part, of the indicia of energy on the channel, wherein the activation event includes at least placing the receiver into an increased power mode of operation and transmitting on the channel.

For example, pursuant to a preferred approach, the communication unit can include a first receiver and a second receiver. The first receiver can be used to monitor the indicia of energy on the channel while the second receiver can be used during normal operation of the communication unit. In a preferred approach, the first receiver will use less power during normal operation thereof than the second receiver during normal operation thereof Pursuant to one approach, the first receiver can monitor for indicia of energy on the channel without also decoding messages as may be transmitted on the channel. The first and second receiver can be completely discrete with respect to one another or, more preferably, can share at least some components. Pursuant to one approach, the second receiver includes a digital signal processor while the first receiver does not.

So configured, the 802.11 protocol can be slightly modified to permit greater energy conservation. In particular, pursuant to one approach, an 802.11-compliant device can utilize these embodiments to effect low-power consumption monitoring of the channel to effect clear channel assessment. For example, a first low-power mode receiver can be used to detect channel energy indicia as part of a clear channel assessment process. Upon determining the requisite availability of the channel, a second higher-power mode receiver can then be used to effect the desired transmission and reception functionality.

Figure 1:
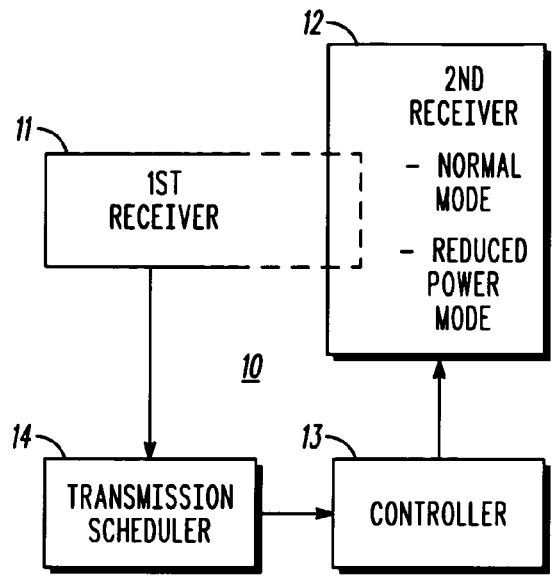
FIG. 1 comprises a block diagram as configured in accordance with various embodiments of the invention.

Referring now to the drawings and in particular to FIG. 1, a communication unit 10 suitable to support such energy conservation methodologies will be described. In a preferred embodiment, the communication unit 10 has at least a first receiver 11 and a second receiver 12. Pursuant to one approach, the first and second receivers 11 and 12 are at least substantially discrete from one another (though it should be understood that, pursuant to some embodiments, such substantially discrete receivers may nevertheless share at least some components as symbolized in this depiction by the phantom line portion of the first receiver 11 that impinges upon the block representing the second receiver 12). For example, the second receiver 12 can be comprised, at least in part, of an integrated digital signal processor while the first receiver 11 is comprised of more discrete elements.

Pursuant to a preferred embodiment, the first receiver 11 can monitor a given channel with respect to the presence or absence of an indicia of energy. It is not necessary that such monitoring include, for example, decoding or decrypting messages that may be present on the channel or to otherwise facilitate ascertainment of the channel-borne content. Instead, the first receiver 11 need only be capable of detecting transmission activity to thereby perform clear channel assessment while requiring only relatively minimal power consumption. For example, received signal strength information (RSSI) detection and/or measurement techniques can be used to determine whether the channel is presently clear (it being understood by those skilled in the art that other energy indicia or detection techniques can be employed as desired and/or as appropriate to suit the needs of a given application).

The second receiver 12 has at least a first mode of operation and a second mode of operation. Generally speaking, the second receiver 12 tends to utilize a first amount of power when using the first mode of operation and a second amount of power when using the second mode of operation. In a preferred embodiment, the second mode of operation corresponds to a normal mode of operation while the first mode of operation comprises a reduced power mode (or fully powered-down mode) of operation. For example, the reduced power mode of operation can comprise a sleep mode wherein some (or all) of the processes of the second receiver 12 are temporarily halted. When the second receiver 12 comprises a digital signal processor, this can include halting (or at least reducing) associated processor computational activity.

So configured, the second receiver 12 will typically utilize more power than the first receiver 11 when operating in the first mode of operation. When operating in the second mode of operation, however, the second receiver 12 will typically utilize less energy than during the first mode of operation and can even utilize less energy than the first receiver 11 if so desired. As will be shown below, this permits the communication device 10 to be flexibly employed in support of a power saving behavior beyond that ordinarily realized with, for example, 802.11-compliant devices.

To facilitate such operability, in a preferred approach the communication unit 10 further comprises a controller 13. This controller 13 can comprise a discrete platform or can be partially or fully integrated with, for example, the second receiver 12 as best suits the needs and requirements of a given application. This controller 13 preferably provides a mode-selection output that operably couples to the second receiver 12 to thereby facilitate control over which mode of operation the second receiver 12 utilizes at any given moment. For example, when used within an 802.11 context, the controller 13 can select to operate the second receiver 12 in the reduced power mode of operation as a function, at least in part, of at least a predetermined aggregate duration of time during which a monitored communication channel has not carried a transmission from another communication unit.

If desired, the communication unit 10 can further employ a transmission scheduler 14 that operably couples to the first receiver 11 and the controller 13. So configured, the transmission scheduler 14 can determine a next-scheduled transmission time as a function, at least in part, of the first receiver's monitoring of the communication channel. The controller 13 can, in turn, use the next-scheduled transmission time to determine when to switch the second receiver 12 from a powered-down mode of operation to a more normal mode of operation. Such a configuration accords well with the stipulated requirements of the 802.11 protocol while nevertheless permitting the communication unit 10 to achieve even further power savings by reducing the power consuming activities of the second receiver 12 while assessing, for example, aggregate clear channel status in preparation of transmitting a message to an access point.

Figure 2:
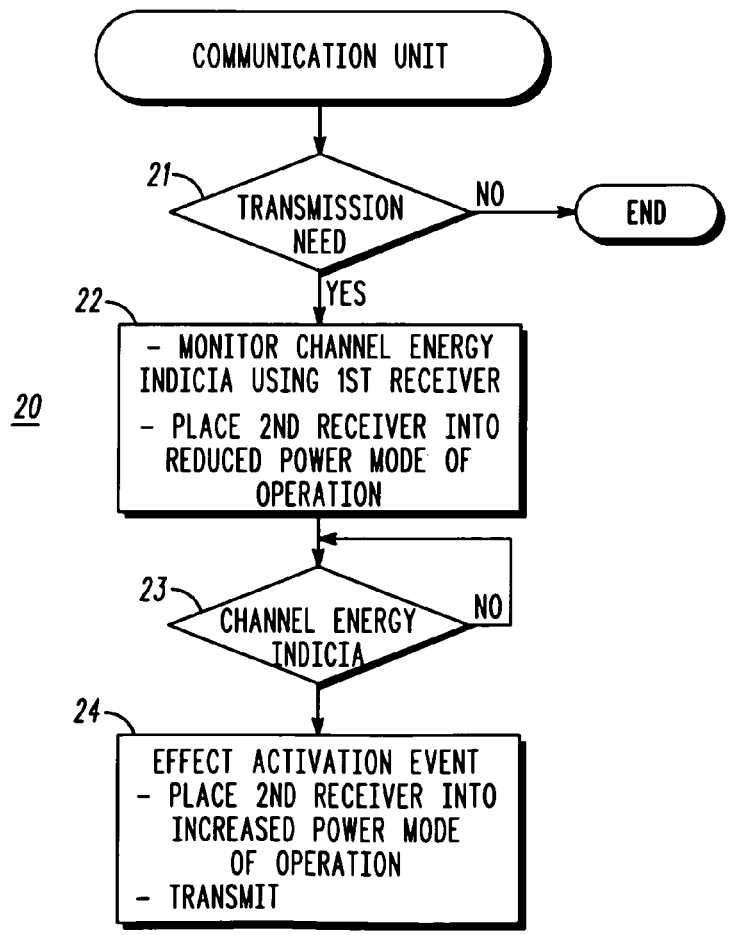
FIG. 2 comprises a flow diagram as configured in accordance with various embodiments of the invention.

Referring now to FIG. 2, an overview of an energy conservation process suitable for use with such a communication unit 10 (or such other device as will compatibly support these teachings) will be provided. Pursuant to a preferred approach, the communication unit determines 21 when a transmission need exists. For example, pursuant to the 802.11 protocol noted above, the communication unit may be required to transmit a message regarding present availability and need to an access point (which would be followed by a corresponding need to monitor the communication channel for an outbound transmission from the access point to the communication unit). When such a need exists the communication unit uses 22 a first receiver to monitor the channel for indicia of energy while substantially simultaneously placing a second receiver into a reduced power mode of operation. This will facilitate an overall reduction in power as the first (lower powered) receiver can effect a clear channel procedure while the second (higher powered) receiver assumes a sleep mode status (which sleep mode can comprise a partially or fully powered-down mode of operation as desired).

Pursuant to a preferred mode of operation, this state will be extant for at least a first predetermined amount of time. This predetermined amount of time can be relatively static and unchanging or can be changed over time. For example, the amount of time can be predetermined pursuant to a dynamic process. To illustrate, a pseudorandom value can be selected as the predetermined amount of time. Such an approach may be appropriate, for example, when using this approach in conjunction with an 802.11 protocol-based communication.

Upon detecting 23 the requisite channel energy indicia, the process 20 then effects 24 an activation event. In a preferred approach this activation event can include at least placing the second receiver into an increased power mode of operation and transmitting on the channel. For example, the process 20 can cause the second receiver to resume a normal mode of operation such that the second receiver can monitor for an anticipated response from an access point subsequent to transmission of an availability signal to the access point.

Such a process 20 facilitates operating the second receiver in a reduced power mode of operation during a given duration of time while simultaneously using the first receiver to monitor a channel to thereby detect indicia of transmissions from other communications units. In a preferred approach, this duration of time can be dynamically modified during the process 20 as a function, at least in part, of any detected transmissions from other communications units to provide a modified duration of time (for example, the original duration of time can be extended by an amount of time that equals the duration of time that the first receiver detects indicia of transmissions from other units). The second receiver can continue to be operated in a reduced power mode of operation during such a modified duration of time. Furthermore, a transmission time can be selected as a function, at least in part, of such a modified duration of time (for example, the transmission can be scheduled to occur at the conclusion of the modified duration of time).

Such an approach permits a protocol such as the 802.11 protocol to be accommodated while also achieving significant power consumption reductions. In particular, under operating conditions that would tend to lead to relatively rapid depletion of power reserves under ordinary 802.11 processing, the above approach will result in considerably reduced power consumption.

Figure 3:
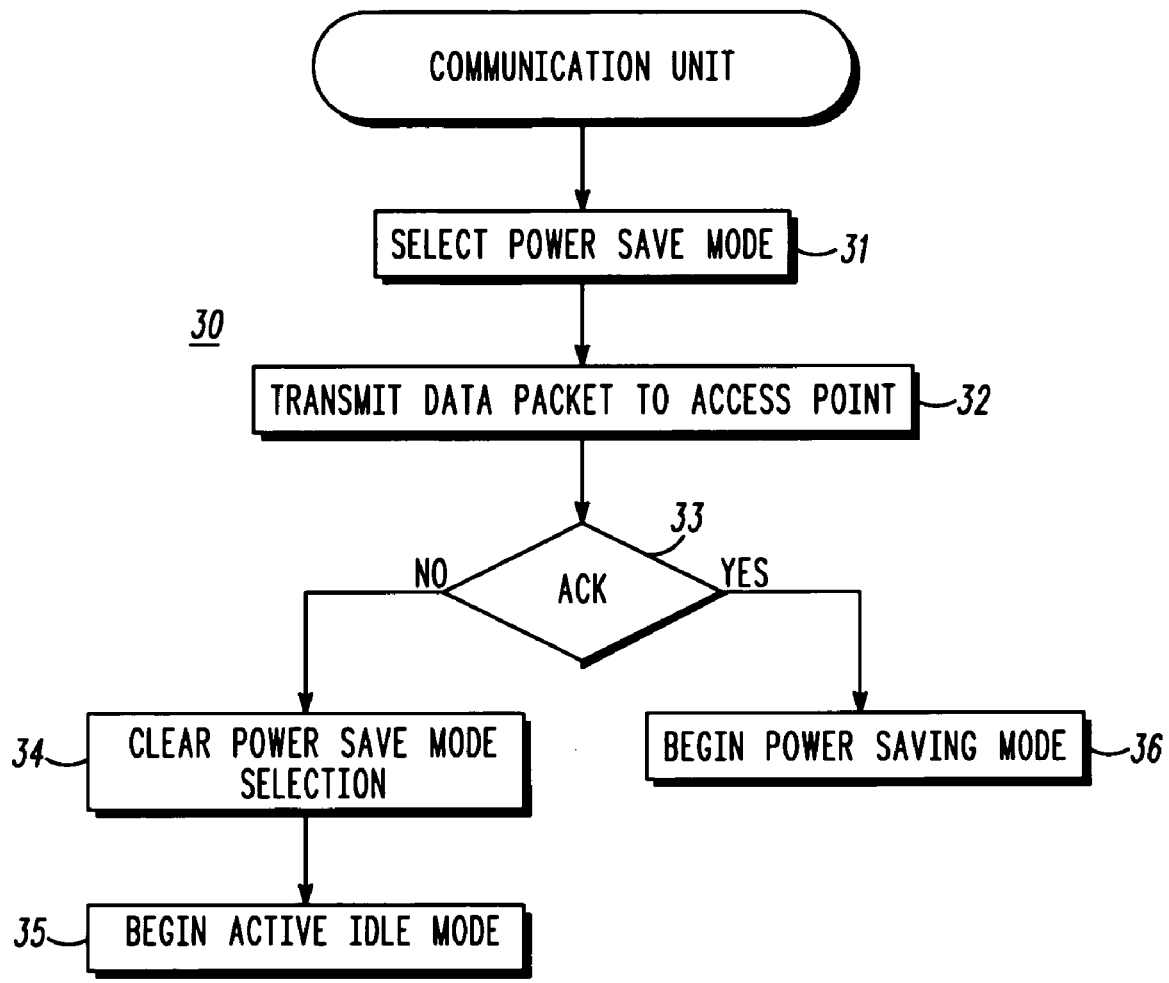
FIG. 3 comprises a flow diagram as configured in accordance with an embodiment of the invention.

Referring now to FIG. 3, a more specific embodiment and example, within the context of 802.11 compliance, will be presented. Pursuant to this process 30, the communication unit selects 31 a power saving mode of operation (for example, by setting a corresponding mobile terminal power management state register). It will be understood by those skilled in the art that this comprises selection of the usual power saving mode as provided by 802.11, albeit as modified to incorporate these teachings. Upon selecting 31 this power saving mode, the communication unit will then transmit 32 a data packet to its corresponding access point to inform the access point of a need to buffer packets received by the access point for transmission to the communication unit in accordance with well understood prior art technique. Such buffering serves to preserve the availability of such packets until such time as the communication unit becomes available to receive such packets.

When the communication unit fails to receive an acknowledgement 33 from the access point in response to its transmission 32, the process 30 clears 34 the power save mode selection (for example, by clearing a corresponding register) and begins 35 an active idle mode of operation, all as understood in the art. During the active idle mode of operation, most or all of the communication unit's various components are fully powered to enable constant packet reception and decoding capability that is interruptible by the communication unit to facilitate packet transmission needs as may arise in the interim. When the communication unit does receive the acknowledgement 33 signal, however, the communication unit then begins 36 a power saving mode. During an ordinary power saving mode of operation as per 802.11, the communication unit begins a sleep mode where selected sub-circuits are shut down or placed into a low processing mode. These sub-circuits are brought back to full operation at regularly spaced target beacon transmission times to facilitate the reception of access point beacon transmissions. Such processes are also interruptible to again permit transmissions as and when the need arises. As will now be shown with reference to FIG. 4, this basic power saving mode of operation can be modified to reflect these teachings to thereby effect improved energy conservation.

Figure 4:
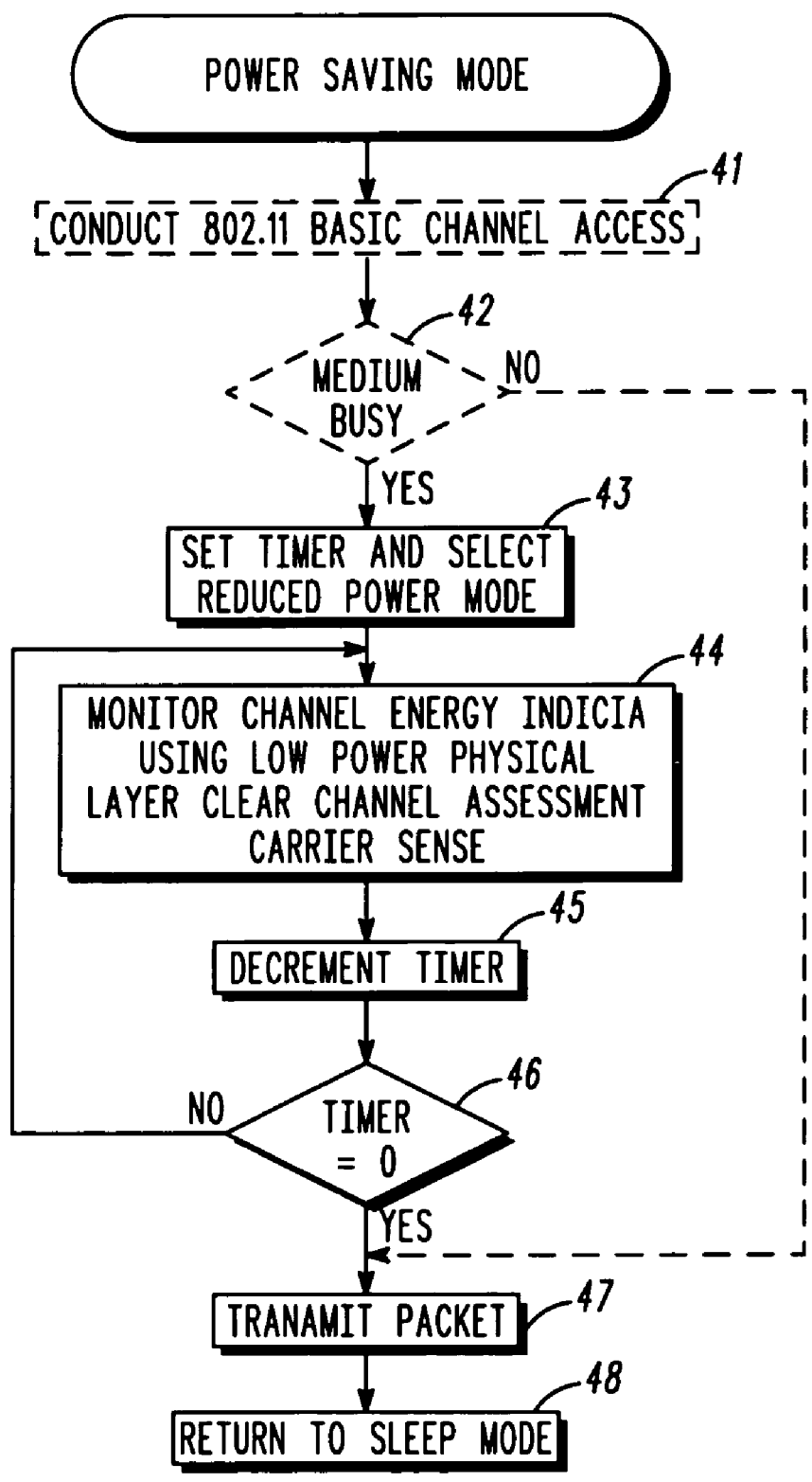
FIG. 4 comprises a flow diagram as configured in accordance with various embodiments of the invention.

Referring now to FIG. 4, during the power saving mode process 40, the communication unit can optionally conduct 41 an ordinary 802.11 basic channel access process and determine 42 whether the communication medium is presently busy. When not busy, the communication unit can simply transmit 47 its packet and return 48 to its sleep mode, essentially in accordance with prior art technique. When the communication unit determines 42, however, that the medium is busy, the process 40 provides for the setting 43 of a timer and the selection of a reduced power mode. The timer has a duration that can comprise, for example, the 50 millisecond window stipulated by the 802.11b protocol during which the communication unit is to monitor the channel to ensure that the channel remains clear.

During this timer-prescribed window, the communication unit monitors 44 channel energy indicia using a low power physical layer clear channel assessment carrier sense. For example, as noted above, RSSI measurement techniques can be used to sense the presence of channel-borne energy that evidences the transmission activities of other communication units. Such an approach can be achieved with minimal components and/or computational activity as, for example, the monitored transmissions are not decoded or otherwise processed to ascertain their substantive content. In turn, of course, such simple monitoring can be realized with a considerably reduced power gain as compared to traditional use of the second receiver for this monitoring activity.

During this monitoring activity, the process 40 regularly decrements 45 a time during those times when the channel appears to be clear. In a preferred embodiment, such decrementation does not occur when the channel evidences transmission activity. When the communication unit determines 46 that the timer has been fully decremented, the communication unit can transmit 47 its packet to the access point and then return 48 to a sleep mode of operation.

Pursuant to these embodiments, a communication unit can be configured to utilize a reduced power mode of operation, either alone or in conjunction with other sleep modes of operation, during times when certain minimal reception functionality requires support. Full-featured (and full power) reception functionality can then be restored as required.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   at a communication unit:
   determining a need to transmit a communication on a channel;
   using a first receiver to monitor asynchronous indicia of energy on the channel as part of a clear channel assessment while substantially simultaneously placing a second receiver into a reduced power mode of operation, wherein the first receiver uses less power during normal operation thereof than the second receiver uses during normal operation thereof;
   effecting an activation event as a function, at least in part, of the indicia of energy on the channel, wherein the activation event includes at least:
   placing the second receiver into an increased power mode of operation; and
   transmitting on the channel.

2. The method of claim 1 wherein determining a need to transmit a communication on a channel comprises determining a need to transmit a message on the channel and to then monitor the channel using the second receiver for a transmission to the communication unit.

3. The method of claim 1 wherein using a first receiver to monitor indicia of energy on the channel comprises using a first receiver that is substantially discrete from the second receiver.

4. The method of claim 3 wherein using a first receiver that is substantially discrete from the second receiver comprises using a first receiver that is substantially discrete from the second receiver while nevertheless sharing at least some components.

5. The method of claim 1 wherein using a first receiver to monitor indicia of energy on the channel comprises using a first receiver to monitor indicia of energy on the channel without also decoding messages as may be transmitted by others on the channel.

6. The method of claim 1 wherein substantially simultaneously placing a second receiver into a reduced power mode of operation comprises substantially simultaneously placing a second receiver into a powered-down mode of operation.

7. The method of claim 1 wherein using a first receiver to monitor indicia of energy on the channel while substantially simultaneously placing a second receiver into a reduced power mode of operation comprises using a first receiver that lacks a digital signal processor to monitor indicia of energy on the channel while substantially simultaneously placing a second receiver that comprises a digital signal processor into a reduced power mode of operation.

8. The method of claim 1 wherein using a first receiver to monitor indicia of energy on the channel while substantially simultaneously placing a second receiver into a reduced power mode of operation comprises using a first receiver to monitor indicia of energy on the channel while substantially simultaneously placing a second receiver into a reduced power mode of operation for at least a first predetermined amount of time.

9. The method of claim 8 wherein using a first receiver to monitor indicia of energy on the channel while substantially simultaneously placing a second receiver into a reduced power mode of operation for at least a first predetermined amount of time comprises using a first receiver to monitor indicia of energy on the channel while substantially simultaneously placing a second receiver into a reduced power mode of operation for at least a first predetermined amount of time wherein at least a portion of the first predetermined amount of time represents a dynamically selected amount of time.

10. The method of claim 9 and further comprising determining the dynamically selected amount of time as a function, at least in part, of a pseudorandom selection of a value.

11. A method of selecting a transmission time using a communication unit comprising:
providing a first receiver in the communication unit that utilizes a first amount of energy during normal operation;
providing a second receiver in the communication unit that utilizes a second amount of energy during normal operation, which second amount of energy is greater than the first amount of energy;
providing a duration of time;
operating the second receiver in a reduced power mode of operation during at least a part of the duration of time;
using the first receiver to monitor a channel to thereby detect indicia of transmissions from other communications units during at least a part of the duration of time;
modifying the duration of time as a function, at least in part, of any detected transmissions from other communication units to provide a modified duration of time;
operating the second receiver in an increased power mode of operation as a function, at least in part, of the modified duration of time;
selecting a transmission time as a function, at least in part, of the modified duration of time.

12. The method of claim 11 wherein providing a first receiver comprises providing a first receiver that monitors energy in at least a first communication channel.

13. The method of claim 12 wherein providing a first receiver that monitors energy in at least a first communication channel comprises providing a first receiver that monitors energy in at least a first communication channel but that does not decode transmissions carried by the first communication channel.

14. The method of claim 11 wherein providing a second receiver comprises providing a second receiver that decodes transmissions carried by the first communication channel.

15. The method of claim 11 wherein:
providing a first receiver comprises providing a first receiver that monitors energy in at least a first communication channel but that does not decode transmissions carried by the first communication channel; and
providing a second receiver comprises providing a second receiver that decodes transmissions carried by the first communication channel.

16. The method of claim 11 wherein providing a duration of time comprises providing a duration of time as a function, at least in part, of selecting a value in at least a pseudorandom manner.

17. The method of claim 11 wherein operating the second receiver in a reduced power mode of operation comprises operating the second receiver in a substantially fully powered-down mode of operation.

18. The method of claim 11 wherein modifying the duration of time as a function, at least in pan, of any detected transmissions from other communication units to provide a modified duration of time comprises modifying the duration of time by extending the duration of time as a function, at least in part, of a length of time that the first receiver detects the indicia of transmissions fmm other communications units.

19. The method of claim 18 wherein extending the duration of time comprises stopping a count.

20. The method of claim 19 wherein stopping a count comprises stopping a count for a period of time that corresponds, at least in part, to the length of time that the first receiver detects the indicia of transmissions from other communication units.

21. A communication unit comprising:
a first receiver that utilizes a first amount of energy during normal operation;
a second receiver that is at least partially discrete from the first receiver and that has at least a first mode of operation and a second mode of operation, wherein the first mode of operation utilizes a second amount of energy that is greater than the first amount of energy and the second mode of operation utilizes a third amount of energy that is less than the second amount of energy;
a controller that has a mode-selection output operably coupled to the second receiver;
a transmission scheduler having a next-scheduled transmission time output that is responsive to the first receiver and that is operably coupled to the controller; such that the first receiver can monitor a communication channel using a particular amount of energy while the controller causes the second receiver to operate in the second mode of operation to thereby also use no more than The particular amount of energy, and the transmission scheduler can determine a next-scheduled transmission time as a function, at least in part, of the first receiver's monitoring of The communication channel, and the controller can use the next-scheduled transmission time to determine when to switch the second receiver from the second mode of operation to The first mode of operation.

22. The communication unit of claim 21 wherein the second receiver comprises an 802.11 compatible receiver.

23. The communication unit of claim 21 wherein the second mode of operation comprises a fully powered-down mode of operation.

24. The communication unit of claim 21 wherein the second mode of operation comprises a sleep mode of operation and wherein the controller comprises controller means for selecting when to operate the second receiver in the sleep mode of operation as a function, at least in part, of at least a predetermined aggregate duration of time during which the communication channel has not carried a transmission from another communication unit.

25. A method comprising:
   at a communication unit:
   determining a need to transmit a communication on a channel;
   using a first receiver to monitor asynchronous indicia of energy on the channel as part of a clear channel assessment while substantially simultaneously placing the second receiver into a reduced power mode of operation, wherein the first receiver uses less power than during normal operation thereof;
   effecting an activation event as a function, at least in part, of the indicia of energy on the channel, wherein the activation event includes at least:
   placing the second receiver into an increased power mode of operation; and
   transmitting on the channel.

26. The method of claim 25 wherein determining a need to transmit a communication on a channel comprises determining a need to transmit a message on the channel and to then monitor the channel using the second receiver for a transmission to the communication unit.

27. The method of claim 26 wherein using a first receiver to monitor indicia of energy on the channel comprises using a first receiver to monitor indicia of energy on the channel without also decoding messages as may be transmitted by others on the channel.

28. The method of claim 27 wherein using a first receiver to monitor indicia of energy on the channel while substantially simultaneously placing a second receiver into a reduced power mode of operation comprises using a first receiver to monitor indicia of energy on the channel while substantially simultaneously placing the second receiver into a reduced power mode of operation for at least a first predetermined amount of time.

29. The method of claim 28 wherein using a first receiver to monitor indicia of energy on the channel while substantially simultaneously placing a second receiver into a reduced power mode of operation for at least a first predetermined amount of time comprises using a first receiver to monitor indicia of energy on the channel while substantially simultaneously placing a second receiver into a reduced power mode of operation for at least a first predetermined amount of time wherein at least a portion of the first predetermined amount of time represents a dynamically selected amount of time.

30. The method of claim 29 and further comprising determining the dynamically selected amount of time as a function, at least in part, of a pseudorandom selection of a value.

* * * * *